US008178209B2

(12) United States Patent
Qi et al.

(10) Patent No.: US 8,178,209 B2
(45) **Date of Patent: *May 15, 2012**

(54) FUSER MEMBER HAVING FLUORINATED POLYIMIDE OUTER LAYER

(75) Inventors: Yu Qi, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/717,257

(22) Filed: Mar. 4, 2010

(65) Prior Publication Data

US 2011/0217545 A1 Sep. 8, 2011

(51) Int. Cl.

| | |
|---|---|
| ***B32B 27/18*** | (2006.01) |
| ***B32B 27/20*** | (2006.01) |
| ***B32B 27/26*** | (2006.01) |
| ***B32B 27/28*** | (2006.01) |
| ***G03G 15/20*** | (2006.01) |

(52) U.S. Cl. .................... 428/473.5; 428/334; 428/339; 428/421; 428/458; 399/320; 399/328; 399/329; 399/333

(58) Field of Classification Search ........................ None
See application file for complete search history.

(56) References Cited

U.S. PATENT DOCUMENTS

| | | | | |
|---|---|---|---|---|
| 4,760,126 | A * | 7/1988 | Numata et al. | 528/353 |
| 5,144,078 | A * | 9/1992 | Nagase et al. | 564/442 |
| 5,194,579 | A * | 3/1993 | Numata et al. | 528/353 |
| 5,270,438 | A * | 12/1993 | Yusa et al. | 528/353 |
| 5,286,841 | A * | 2/1994 | Auman et al. | 528/353 |
| 5,320,650 | A * | 6/1994 | Simmons | 96/14 |
| 5,449,741 | A * | 9/1995 | Ando et al. | 528/353 |
| 5,580,918 | A * | 12/1996 | Morita et al. | 524/413 |
| 5,922,440 | A * | 7/1999 | Schlueter et al. | 428/195.1 |
| 6,007,918 | A | 12/1999 | Tan et al. | |
| 6,010,791 | A | 1/2000 | Tan et al. | |
| 6,733,943 | B2 * | 5/2004 | Finn et al. | 399/333 |
| 2009/0324959 | A1 * | 12/2009 | Wu | 428/421 |
| 2010/0086713 | A1 * | 4/2010 | Qi et al. | 428/35.7 |
| 2010/0086772 | A1 * | 4/2010 | Qi et al. | 428/334 |

FOREIGN PATENT DOCUMENTS

| | | | |
|---|---|---|---|
| JP | 05-249705 | * | 9/1993 |
| JP | 2004-191546 | * | 7/2004 |
| JP | 2004-251978 | * | 9/2004 |

OTHER PUBLICATIONS

Hall, United Kingdom Patent Application No. 1103539.1, Search Report under Section 17(5), 20091350-GB-NP, Jul. 18, 2011, 3 pages.

* cited by examiner

*Primary Examiner* — Vivian Chen
(74) *Attorney, Agent, or Firm* — Hoffman Warnick LLC

(57) ABSTRACT

A fuser member including a substrate, and thereover, an outer layer comprising a crosslinked fluorinated polyimide and a curing agent is described. The fluorinated polyimide comprises:

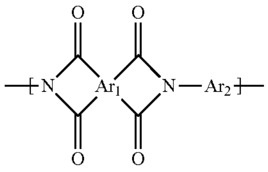

wherein $Ar_1$ and $Ar_2$ independently represent an aromatic group of from about 6 carbon atoms to about 60 carbon atoms; and at least one of $Ar_1$ and $Ar_2$ further contains a fluoropendant group; and wherein the fluorinated polyimide includes an active site capable of reacting with the curing agent.

18 Claims, 1 Drawing Sheet

FUSER MEMBER HAVING FLUORINATED POLYIMIDE OUTER LAYER

BACKGROUND

The disclosure herein relates generally to an imaging apparatus and fuser components thereof for use in electrophotographic, including digital, image-on-image, and like apparatuses. The fuser members are useful for many purposes including fixing a toner image to a copy substrate. More specifically, the disclosure relates to fuser components comprising an outer layer comprising a fluorinated polyimide. In embodiments, the fluorinated polyimide is crosslinked. In embodiments, the fluorinated polyimide outer layer is positioned on a substrate, which may be of many configurations including a roller, belt, film, or like substrate. In embodiments, there is positioned between the substrate and the outer layer, an intermediate and/or adhesive layer. In embodiments, the fusing system is oil-less, thereby eliminating the need for a release oil, release agent, fuser oil, or the like. The fuser members may be useful in xerographic machines, such as copiers, printers, facsimiles, multifunction machines, and including color machines.

In a typical electrophotographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means: a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is desired in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly, it is desired to provide a fusing surface which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

Another method for reducing offset, is to impart antistatic and/or field assisted toner transfer properties to the fuser. However, to control the electrical conductivity of the release layer, the conformability and low surface energy properties of the release layer are often affected.

With a focus on oil-less fusing, energy-efficiency, and fast warm-up time (e.g., inductive heated fuser), belt fusing configuration and reliability/productivity is currently achieved by increased fuser belt size and additional system approaches. There are only a few material solutions that meet the current high demands for fusing, especially for oil-less fusing. Two major material choices include PFA/PTFE for oil-less fusing, and VITON-GF® (DuPont) fluoroelastomers used in combination with oil systems for high end production. Addition of fillers to improve mechanical properties and thermal conductivity is a general trend for life improvement.

PFA represents a type of fluoroplastic, which currently is the only practical material choice for oil-less fusing. However, the downside to using this material includes a resulting mechanically rigid material that is easily damaged by denting or from extensive turning. Also, PFA is difficult to process and there is limited room for material modification. Also, PFA requires high curing temperatures if known coating methods are used.

Turning to VITON®, this material is one of the most popular fluoroelastomers for fusing, as it is mechanically flexible, and less damage results due to its capability to absorb shock energy. The material requires low curing temperatures and has wide material modification latitude. However, this fluoroelastomer requires oil for release due to the low fluorine content of the material.

While the above polymers have desirable properties such as thermal and chemical stability and low surface-energy, fuser members using these materials continue to fail at shorter times than is desirable, primarily due to wear and poor release at the surface (offset).

A new material system for fusing is desired that exhibits improved wear and release properties without requiring the addition of a release fluid (oil-free). In addition, there is a desire to provide an outer layer fusing material that is tunable to enable superior fusing performance with less system parts, and that requires less time for manufacture.

SUMMARY

Embodiments include a fuser member including a substrate, and thereover, an outer layer comprising a crosslinked fluorinated polyimide and a curing agent, wherein the fluorinated polyimide comprises:

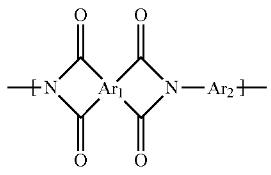

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group; and wherein the fluorinated polyimide includes an active site capable of reacting with the curing agent.

An embodiment includes a fuser member having a substrate, and thereover, an outer layer comprising a crosslinked product resulted from a coating composition comprising a fluorinated polyimide and a curing agent, wherein said polyimide comprises:

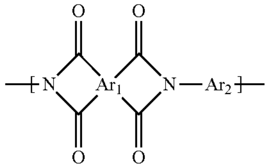

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group, and wherein the fluorinated polyimide includes a segment containing an active site capable of reacting with the curing agent.

In addition embodiments include an image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer component to transfer the developed image from the charge retentive surface to a copy substrate; and an oil-less fuser member for fusing toner images to a surface of the copy substrate, wherein said oil-less fuser member does not require the presence of a fuser oil for release, said oil-less fuser member comprising a substrate, and thereover, an outer layer comprising a fluorinated polyimide and a curing agent wherein the fluorinated polyimide comprises:

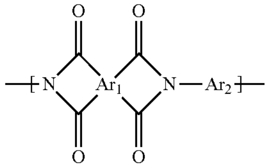

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group, and wherein the fluorinated polyimide contains an active site capable of reacting with the curing agent.

BRIEF DESCRIPTION OF THE DRAWINGS

The above embodiments will become apparent as the following description proceeds upon reference to the drawings, which include the following figures.

DETAILED DESCRIPTION

Fluorinated polyimides are high performance polymers that offer chemical and thermal stability, and enable oil-less fusing. Relatively high fluorinated polyimides are high performance polymers, which offer chemical and thermal stability, in embodiments, and can enable oil-less fusing. Tunable mechanical, physical and/or chemical properties may be achieved by adjusting the component ratio of the relatively stiff aromatic segment and relatively soft fluorinated aliphatic segment. Reactive sites may be introduced to accommodate the site for curing and/or crosslinking. The polyimide can be prepared by known reactions, namely polycondensation between aromatic dianhydrides and diamines. By properly tailoring the structure, the resulting polyimide can possess the desired properties potentially for oil-less fusing applications.

Figure 1:
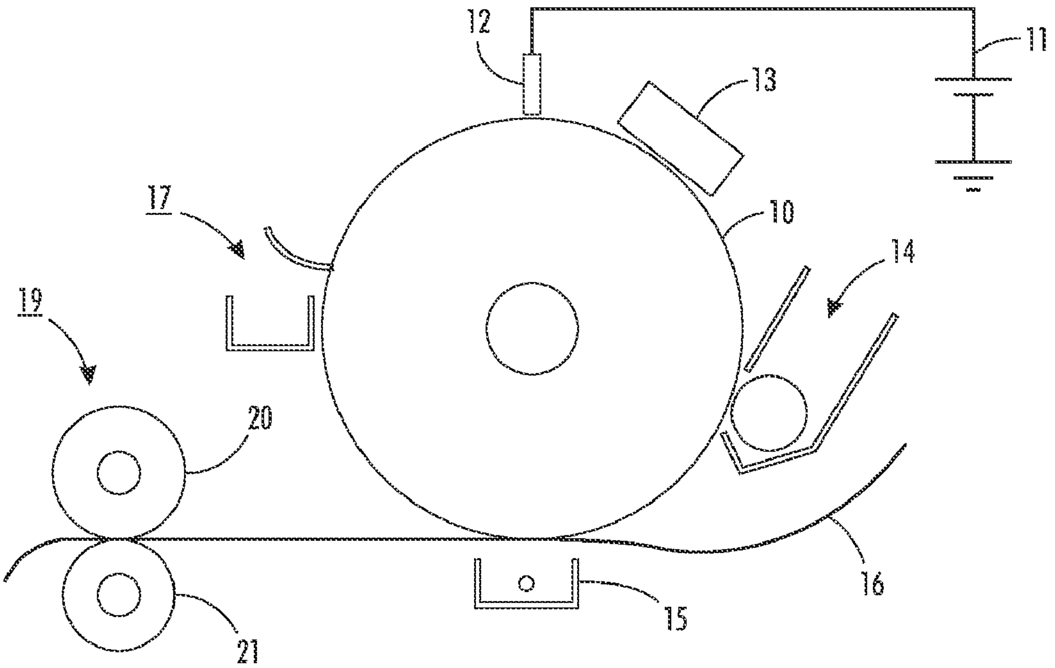
FIG. 1 is an illustration of a general electrophotographic apparatus.

Referring to FIG. 1, in a typical electrophotographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor 10 is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Subsequent to transfer, photoreceptor 10 advances to cleaning station 17, wherein any toner left on photoreceptor 10 is cleaned therefrom by use of a blade (as shown in FIG. 1), brush, or other cleaning apparatus.

Figure 2:
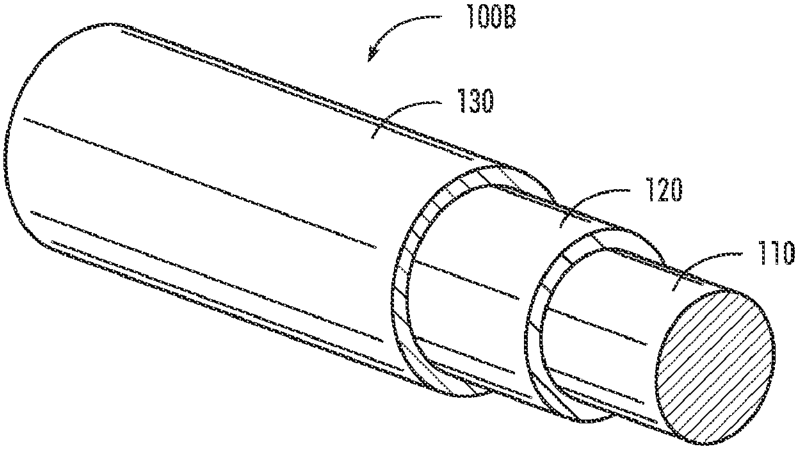
FIG. 2 is a sectional view of an embodiment of a fuser roller having a three-layer configuration.

FIG. 2 is an enlarged schematic view of an embodiment of a fuser member 100, demonstrating the various possible layers. As shown in FIG. 2, substrate 110 has intermediate layer 120 thereon. Intermediate layer 120 can be, for example, a rubber such as silicone rubber or other suitable rubber material. On intermediate layer 120 is positioned outer layer 130, comprising a polymer as described below.

The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrophotographic or xerographic, including digital, machine.

The fuser member of the present disclosure can be employed in a wide variety of machines, and is not specifically limited in its application to the particular embodiment depicted herein. In embodiments, the fuser system is oil-less and there is no release agent needed for fusing. No oil is applied to the fuser member, and the release agent delivery rollers are not present in the system. However, in other embodiments, the system could possibly use a release agent.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C. or greater than about 200° C.), and capable of exhibiting high mechanical strength.

A fluorinated polyimide is described for fuser topcoats. The fluoropolyimide contains long fluoroalkyl side chains along the aromatic polyimide backbone and the fluorophenylether moiety readily crosslinkable via bisphenol type crosslinking reaction. The fluoroalkyl side chains provide releasing properties due to their low surface energy nature.

The outer layer comprises a fluorinated polyimide. More specific examples of fluorinated polyimides include the following general formula:

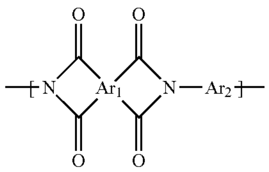

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group, and the fluorinated polyimide includes an active site capable of reacting with the curing agent.

$Ar_1$ and $Ar_2$ can represent a fluoroalkyl having from about 6 carbon atoms to about 60 carbon atoms, or from about 6 carbon atoms to about 40 carbon atoms. In addition, $Ar_1$ and $Ar_2$ can include the active site on of the fluorinated polyimide.

Examples of aromatic $Ar_1$ include

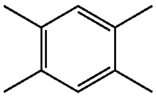,
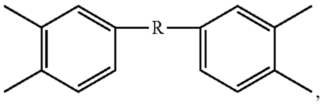,
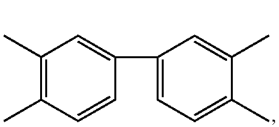,
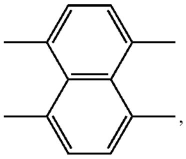,
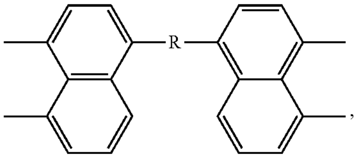,
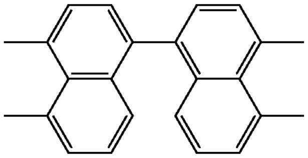, and their fluorinated or perfluorinated analogs, and mixtures thereof. R is a linkage group selected from the group consisting of hexafluoromethylisopropylidene, a sulfur group, an oxy group, a carbonyl group, and a sulfonyl group.

Examples of aromatic $Ar_2$ groups include

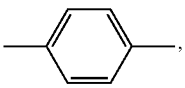,
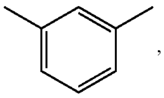,
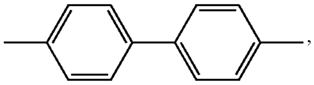,
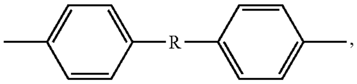, and their fluorinated and perfluorinated analogs, and mixtures thereof. R is a linkage group selected from the group consisting of hexafluoromethylisopropylidene, a sulfur group, an oxy group, a carbonyl group, and a sulfonyl group.

The fluoro-pendant groups include $—C_mH_{2m}C_nF_{(2n+1)}$, $—C_nF_{(2n+1)}$,

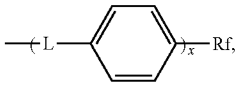
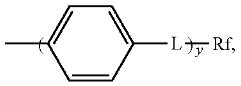
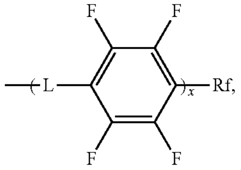
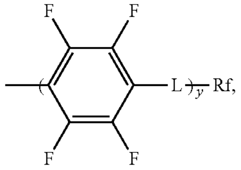

and the mixture thereof. Rf represents fluorine, and a fluorinated aliphatic hydrocarbon group from about 1 to about 18 carbon atoms; L represents linkage group including hexafluoromethylisopropylidene, a sulfur group, an oxy group, a carbonyl group, and a sulfonyl group, m and n are integers independently selected from about 1 to about 18, x and y are numbers independently selected from about 1 to about 5.

The active site includes

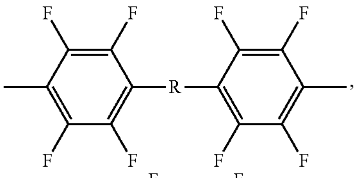
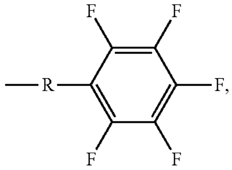
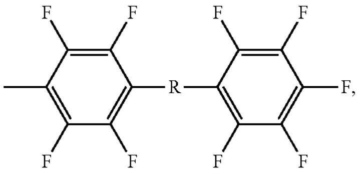

-continued

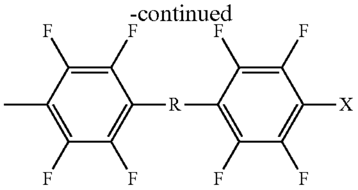

and mixtures thereof, wherein one of the F serves as the active site. R is a linkage group including hexafluoromethylisopropylidene, a sulfur group, an oxy group, a carbonyl group, and a sulfonyl group; and X is an alkyl group or fluorinated alkyl group of from 1 to 18 carbon atoms. The active site can be part of $Ar_1$ or $Ar_2$.

The crosslinked product is results from a nucleophilic reaction at the active site of the segment with the curing agent.

The crosslinking agent includes a bisphenol, a diamine, an aminosilane and a phenolsilane. More specifically, the crosslinking agent includes

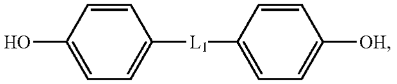

$H_2N—L_2—NH_2$,

-continued $H_2N—L_3—SiRp(OR')_{3}$-p,

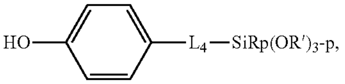

and mixtures thereof, wherein $L_1$ is a linkage group including hexafluoromethylisopropylidene, isopropylidene, methylene, a sulfonyl group, a sulfur group, an oxy group, and a carbonyl group; $L_2$ is a linkage group including an alkylene group from 1 to about 18 carbon atoms or an aromatic hydrocarbon group from 6 to about 30 carbon atoms, $L_3$ is a linkage group including an alkylene group from 1 to about 6 carbon atoms or —$CH_2CH_2$—NH—$CH_2CH_2CH_2$—, $L_4$ is a linkage group including an alkylene group from 1 to about 18 carbon atoms or an aromatic hydrocarbon group from 6 to about 30 carbon atoms, and R represent an alkyl group including methyl, ethyl, propyl, butyl, isopropyl, isobutyl, and p is an integer of from 0 to 2.

In embodiments, the fluorinated polyimide may have the following formula;

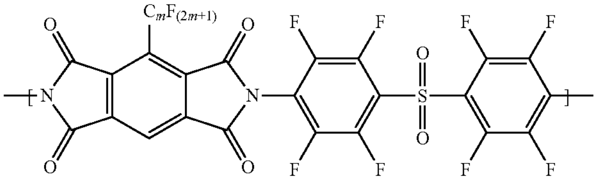

,

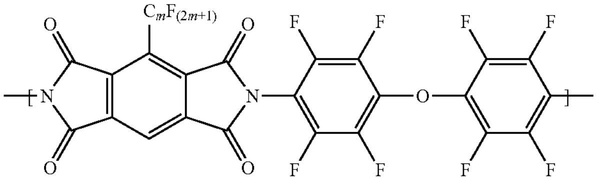

,

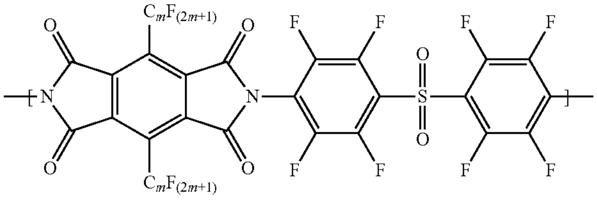

,

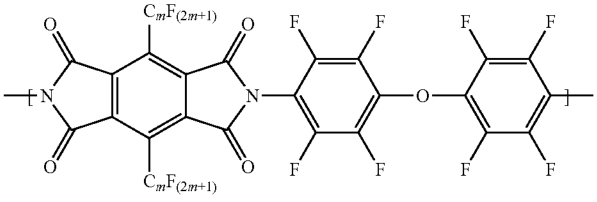

,

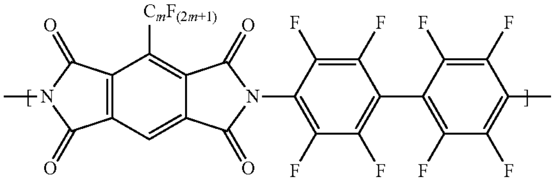

,

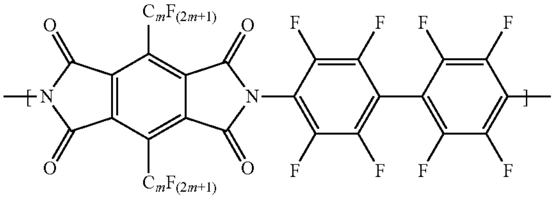

-continued
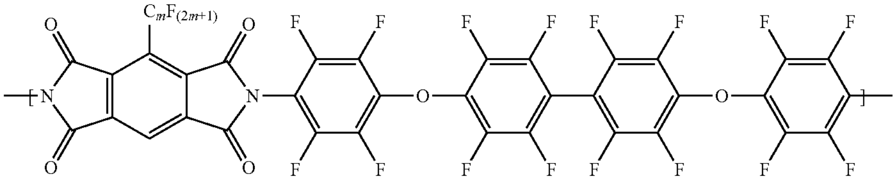
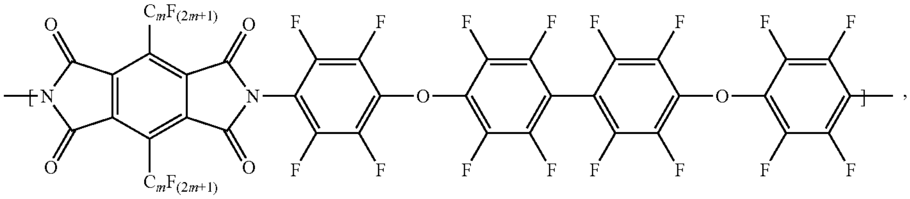
,
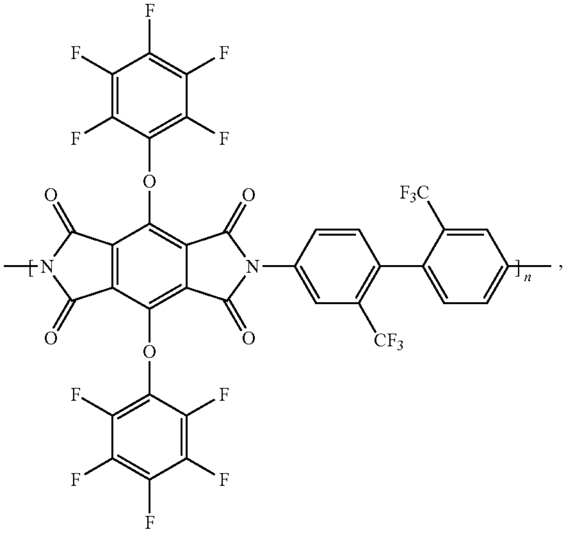
,
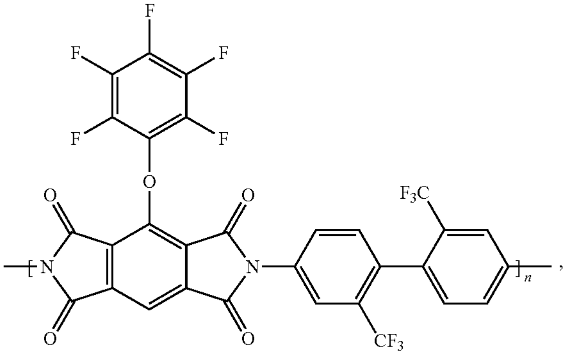
,
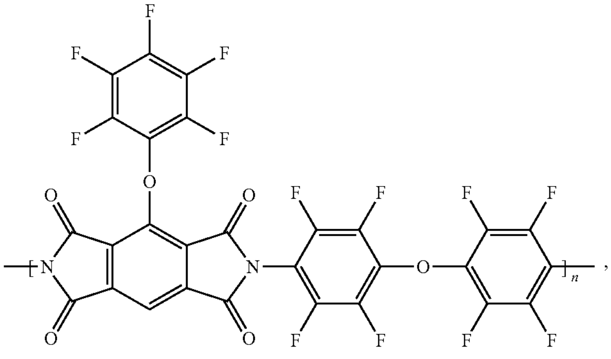
,

-continued
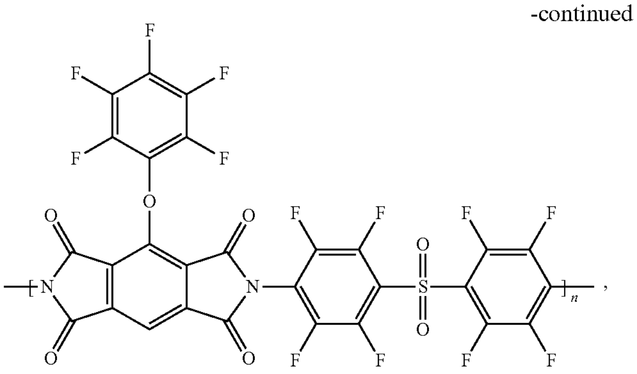
,
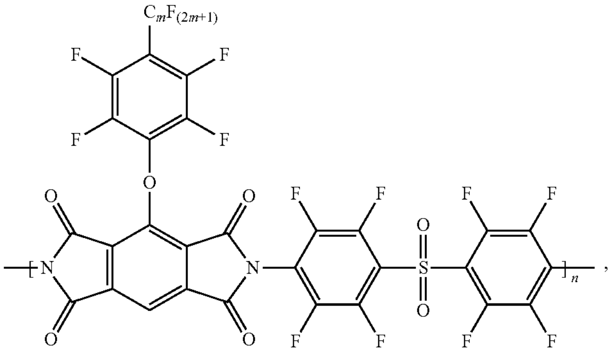
,
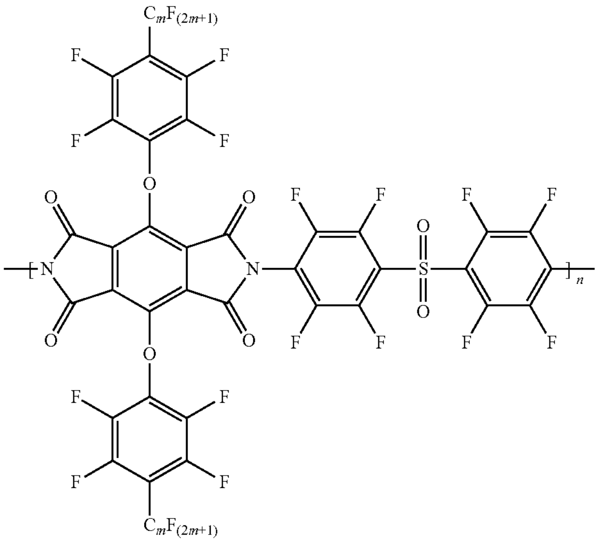
and mixtures thereof, wherein m is an integer of from 1 to about 18.

In embodiments, the crosslinked product comprises a structure formula selected from the group consisting of
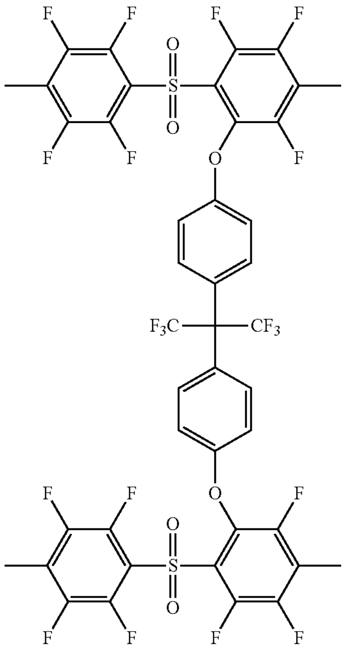
,
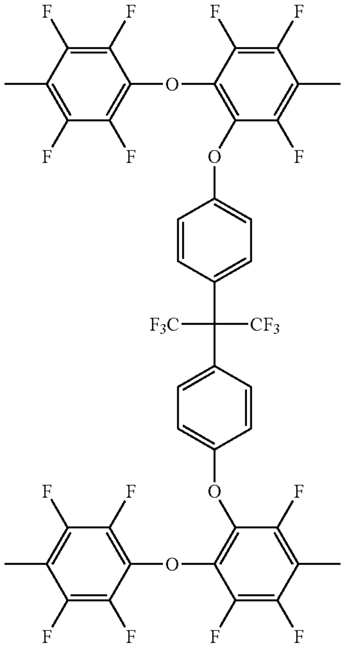
,
-continued
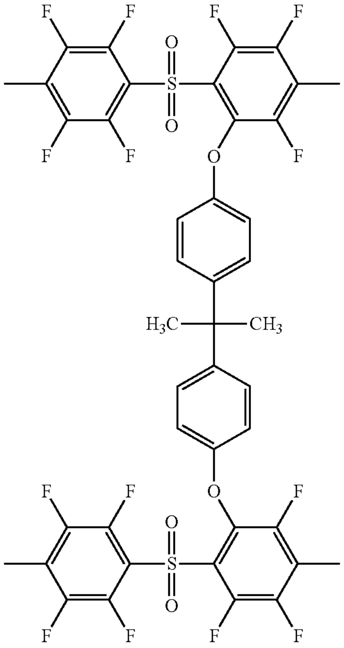
,
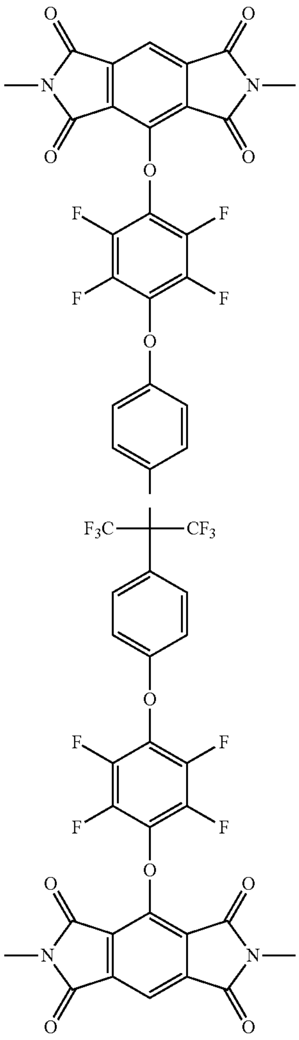
, -continued

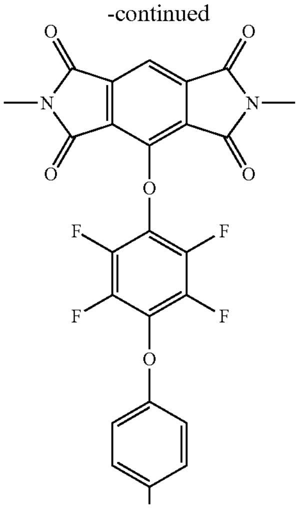

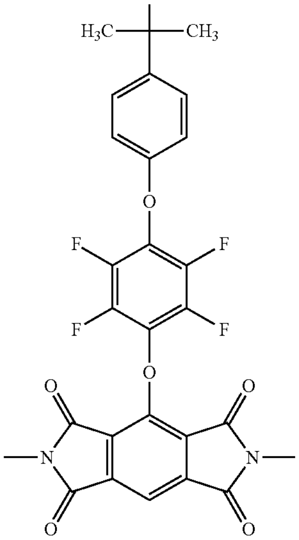

,

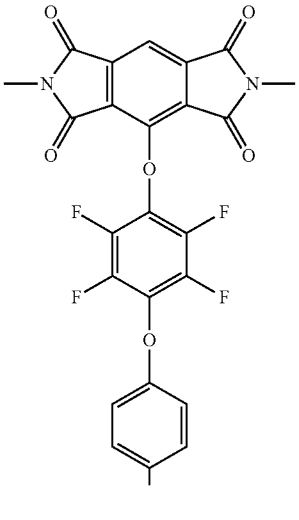

-continued

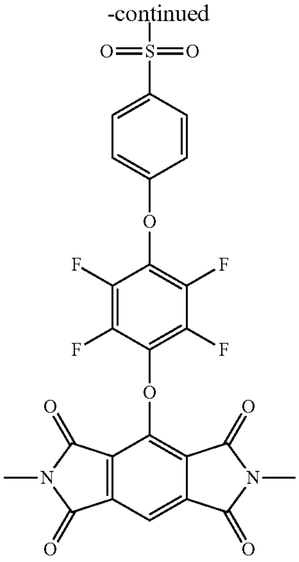

, and the mixtures thereof.

The cross linked product includes a fluorinated polyimide group containing a fluoro-pendant group in the amount of from about 50 to about 95 weight percent of the total solids of the outer layer. The crosslinking agent comprises from about 1 weight percent to about 15 weight percent of the total solids of the outer layer. The active site comprise from about 0.5 weight percent to about 50 weight percent of the total solids of the outer layer.

A filler may be present in the outer layer. The filler may be a metal such as copper, alumina or the like or mixtures thereof; metal oxide such as magnesium oxide, manganese oxide, alumina, copper oxide, titania, silica, other inorganic fillers such as boron nitride, silica carbide, mica, or like oxides or mixtures thereof; carbon filler such as carbon black, graphite, fluorinated carbon black, or the like or mixtures thereof; polymer filler such as polytetrafluoroethylene, polyaniline, or other like polymer filler or mixtures thereof; or other like filler or mixtures thereof. The filler is present in the outer layer composition in an amount of from about 3 percent to about 50 percent, or from about 5 percent to about 30 percent, or from about 10 percent to about 20 percent by weight of total solids.

The outer layer is coated to a thickness of from about 5 microns to about 100 microns, or from about 20 microns to about 40 microns, or from about 15 microns to about 25 microns.

The outer material composition can be coated on the substrate in any suitable known manner. Typical techniques for coating such materials on the reinforcing member include liquid flow-coating, dip coating, wire wound rod coating, fluidized bed coating, powder coating, electrostatic spraying, sonic spraying, blade coating, and the like. In an embodiment, the fluorinated polyimide material coating is flow coated to the substrate. Details of the flow coating procedure can be found in U.S. Pat. No. 5,945,223, the disclosure of which is hereby incorporated by reference in its entirety.

In an embodiment, the outer layer may be modified by any known technique such as sanding, polishing, grinding, blasting, coating, or the like. In embodiments, the outer fluorinated polyimide layer has a surface roughness of from about 0.02 micrometers to about 1.5 micrometers, or from about 0.3 micrometers to about 0.8 micrometers.

In embodiments, an intermediate layer can be positioned between the substrate and outer layer. In other embodiments, an outer release layer can be positioned on the outer layer, or the fuser member can be oil-less—not requiring a release agent or fuser oil for suitable release.

Examples of suitable intermediate layers or suitable optional outer release layers include silicone rubber, fluoropolymer, urethane, acrylic, titamer, ceramer, hydrofluoroelastomer, polymers (such as polymers, copolymers, terpolymers and the like), or mixtures thereof, and fillers such as carbon black and/or aluminum oxide. In embodiments, the intermediate layer comprises a silicone rubber.

The optional intermediate layer and/or optional outer release layer can be coated to the outer layer using any known, suitable technique. In an embodiment, the additional layers can be spray or flow coated.

The intermediate layer can have a thickness of from about 2 mm to about 10 mm, or from about 3 mm to about 9 mm, or from about 5 mm to about 8 mm.

The fusing component can be of any suitable configuration. Examples of suitable configurations include a sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like. In an embodiment, the fuser member is a fuser roller. In embodiments, the substrate of the fuser roller is metal, such as aluminum or steel. In embodiments, the substrate is a fuser belt.

As used herein, the fluorinated polyimide can be coated by any known coating technique which refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed.

Optionally, any known and available suitable adhesive layer may be positioned between the outer layer and the substrate, and/or between the outer layer and the outer release layer. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The following Examples are intended to illustrate and not limit the scope herein. Parts and percentages are by weight unless otherwise indicated.

EXAMPLES

Example 1

Synthesis of Prefluoroalkyl-Dianhydride Monomer (I) is Shown Below (I)

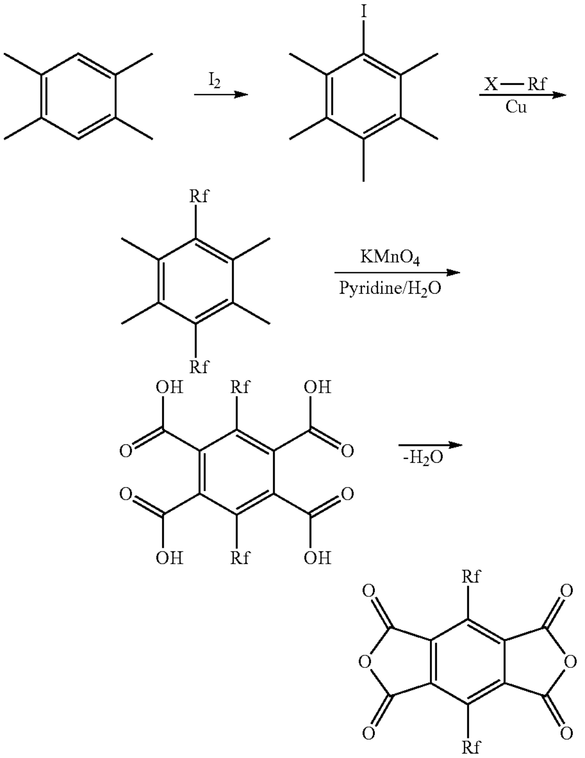

Preparation of diiodo-durene: A mixture of durene (40.27 g), acetic acid (300 mL), iodine (68.53 g), periodic acid (20.51 g), $H_2SO_4$ (15 mL), and $H_2O$ (30 mL) was heated to 80° C. and stirred at 80° C. for 5 hours. After cooling to room temperature, the mixture was poured into ice-water. The precipitated solids were collected by filtration, washed with water, then methanol. The yield of diiodo-durene was 64.8 g (65%).

Preparation of Perfluorooctyl-Substituted Durene: Perfluorooctyl Iodide (14.19 g) was added to 25 mL of dimethylformamide (from Aldrich). To this solution was added activated copper (3.8 g) and diiododurene (3.86 g). The mixture was stirred at 130° C. under Ar for 50 hours. After cooling, the copper was removed by filtration. The solution was poured into excess water, and the precipitated solids were filtered off, washed with water, and dried. The yield was 5 g (51.5%).

Preparation of Perfluorooctyl-Substituted Benzene Tetraacid: Perfluorooctyl-duene (40 g) was dissolved in a mixture of 700 mL of pyridine and 150 mL of water, and 39.51 g of potassium permanganate were added to the mixture, which was then refluxed for 12 hours. After removing pyridine, 28 g (0.7 mol) NaOH, 500 mL water, and 47.41 g (0.3 mol)

KMnO4 were added and the reaction mixture was refluxed for 6 hours. After cooling and filtration, the filtrate was collected. The residual manganese dioxide was extracted twice with boiling water. After treatment with excess concentrated HCl, white solid precipitation was collected by filtration. The solid was dried under vacuum. The yield was 38 g (84%).

Preparation of Perfluorooctyl-Substituted Dianhydride: Perfluorooctyl-tetraacid was treated with pyridine to convert the tetraacid to the dianhydride.

Example 2

Synthesis of Pentafluorophenylether-Substituted Dianhydride Monomer (II)

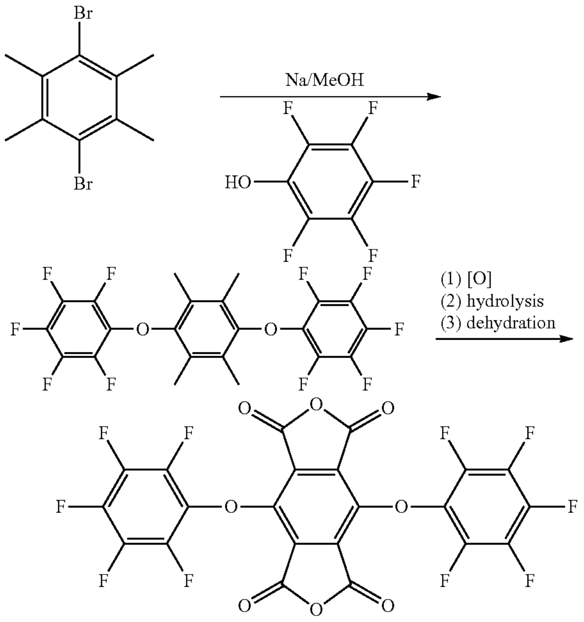

Preparation of pentafluorophenylether-durene: Dibromodurene (11.7 mol), pentafluorophenol (100 g), potassium carbonate (11.04 g) and copper bronze (8 g) were added to DMSO (50 mL) under Ar, and the mixture is stirred at 120° C. for 12 hours. The mixture was poured into NaOH solution and by filtration the product was collected.

Preparation of Pentafluorophenolyether-Dianhydride: the Hydrolysis and condensation procedures are followed according to those in Example 1.

Example 3

Synthesis of Fluorinated Polyimides

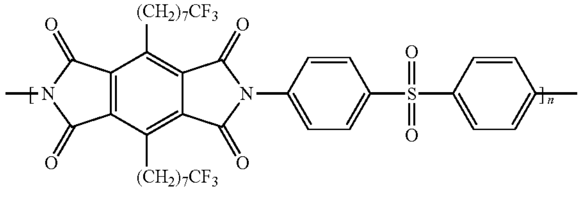

Dianhydride monomer (I) and sulfonyl-diamine with equal equivalents were mixed in m-cresol containing isoquinoline. The solution was heated at 200° C. for 12 hours. After cooling to 50° C., the solution was dropped into methanol. The resulting precipitates were collected by filtration. Drying yields the final polyimide product.

Example 4

Preparation of Crosslinked Polyimide Coatings

The fluoropolyimide of Example 3 was mixed with a bisphenol AF (VC50 obtained from DuPont) and MgO in a MIBK solution. The solution was coated on an aluminum paper substrate and the coating was heated at 200° C. for 2 hours, resulting in a cured polyimide film.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A fuser member comprising a substrate, and thereover, an outer layer comprising a crosslinked fluorinated polyimide with a curing agent, wherein said fluorinated polyimide comprises:

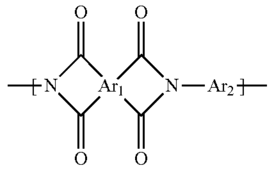

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group;

wherein the fluorinated polyimide includes an active site capable of reacting with the curing agent; and wherein the active site is selected from a group consisting of

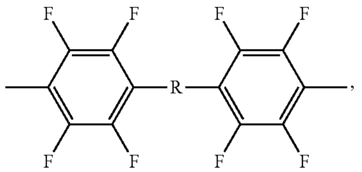

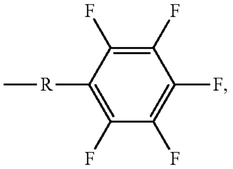

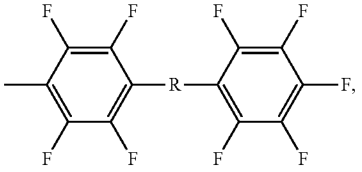

-continued

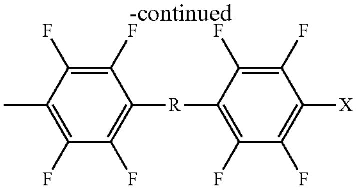

wherein R is a linkage group selected from the group consisting of hexafluoromethylisopropylidene, a sulfur group, an oxy group, a carbonyl group, and a sulfonyl group, and X is an alkyl group or fluorinated alkyl group of from 1 to 18 carbon atoms.

2. The fuser member of claim 1, wherein $Ar_1$ comprises a framework selected from the group consisting of

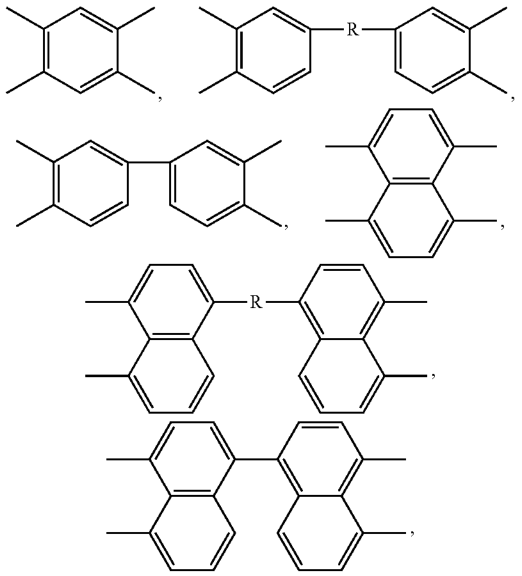

and their fluorinated or perfluorinated analogs, wherein R is a linkage group selected from the group consisting of hexafluoromethylisopropylidene, a sulfur group, an oxy group, a carbonyl group, and a sulfonyl group.

3. The fuser member of claim 1, wherein the framework of $Ar_2$ is selected from the group consisting of

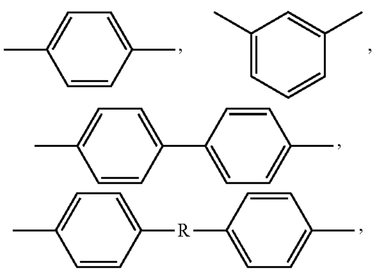

and their fluorinated and perfluorinated analogs, wherein R is a linkage group selected from the group consisting of hexafluoromethylisopropylidene, a sulfur group, an oxy group, a carbonyl group, and a sulfonyl group.

4. The fuser member of claim 1, wherein the fluoro-pendant group is selected from a group consisting of $—C_mH_{2m}C_nF_{(2n+1)}$, $—C_nF_{(2n+1)}$,

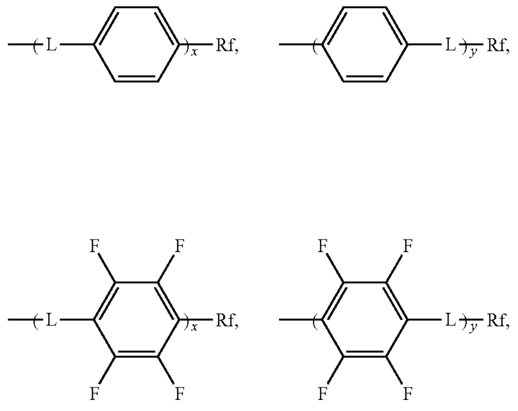

wherein Rf represents fluorine, or a fluorinated aliphatic hydrocarbon group having about 1 to about 18 carbon atoms; L represents a linkage group selected from the group consisting of hexafluoromethylisopropylidene, a sulfur group, an oxy group, a carbonyl group, and a sulfonyl group, m and n are integers independently selected from about 1 to about 18, x and y are integers independently selected from about 1 to about 5.

5. The fuser member of claim 1, wherein the crosslinking agent comprises a bisphenol, a diamine, an aminosilane and a phenolsilane.

6. The fuser member of claim 5, wherein the crosslinking agent is selected from a group consisting of

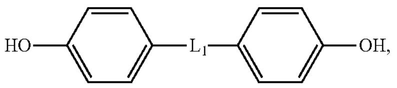

$H_2N—L_2—NH_2$, $H_2N—L_3—SiR_p(OR')_{3-p}$,

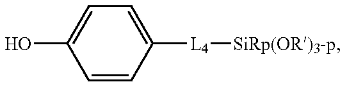

wherein $L_1$ is a linkage group selected from the group consisting of hexafluoromethylisopropylidene, isopropylidene, methylene, a sulfonyl group, a sulfur group, an oxy group, and a carbonyl group; $L_2$ is a linkage group selected from a group consisting of an alkylene group from 1 to about 18 carbon atoms and an aromatic hydrocarbon group from 6 to about 30 carbon atoms, $L_3$ is a linkage group selected from a group consisting of an alkylene group from 1 to about 6 carbon atoms and $—CH_2CH_2—NH—CH_2CH_2CH_2—$, $L_4$ is a linkage group selected from a group consisting of an alkylene group from 1 to about 18 carbon atoms and an aromatic hydrocarbon group from 6 to about 30 carbon atoms, and R represent an alkyl group selected from a group consisting of methyl, ethyl, propyl, butyl, isopropyl, isobutyl, p is an integer of from 0 to 2.

7. The fuser member of claim 1, wherein said fluorinated polyimide is selected from the group consisting of
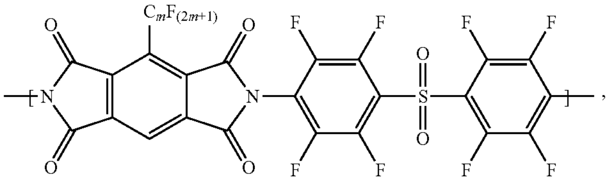
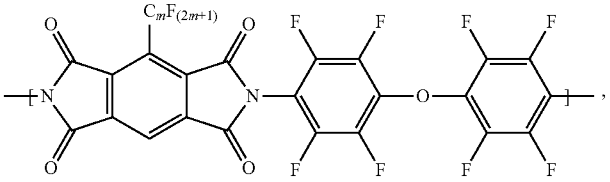
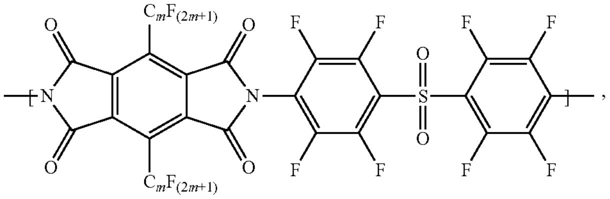
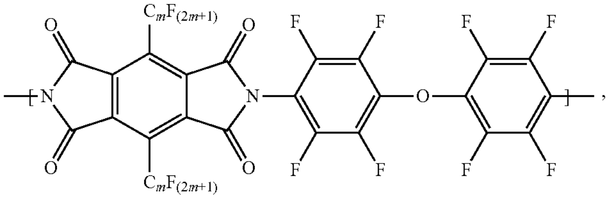
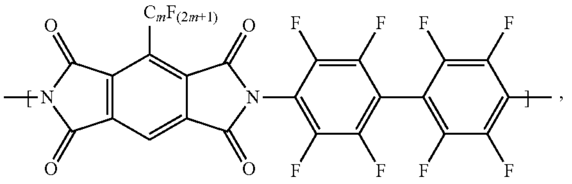
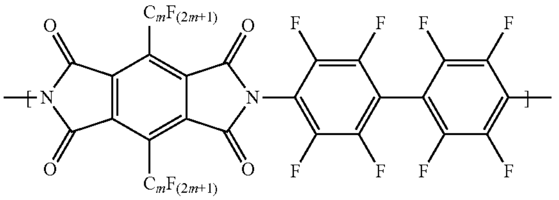
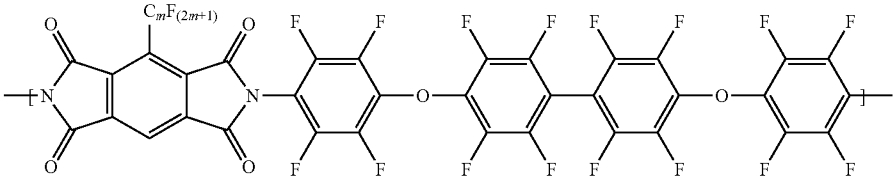
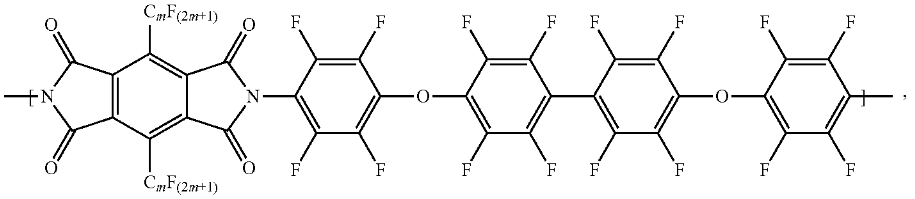

-continued
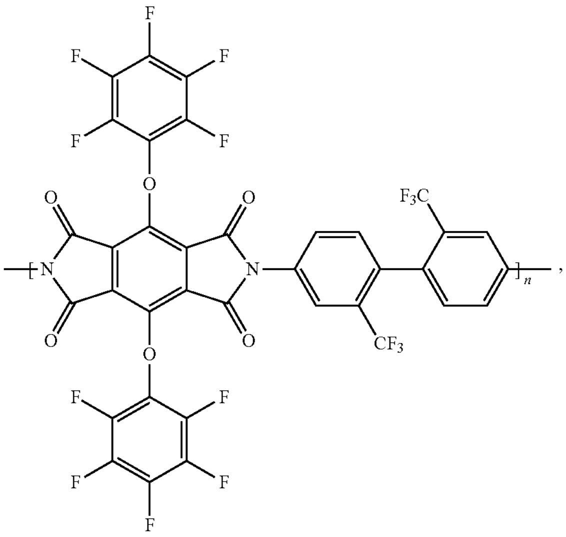,
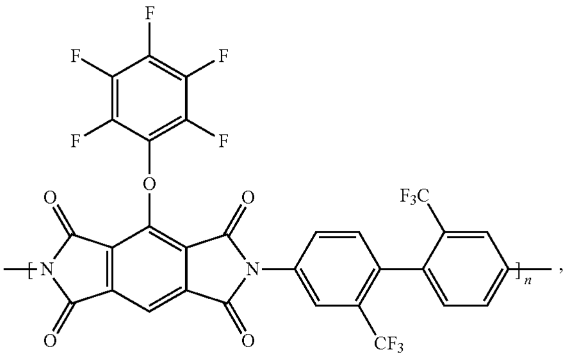,
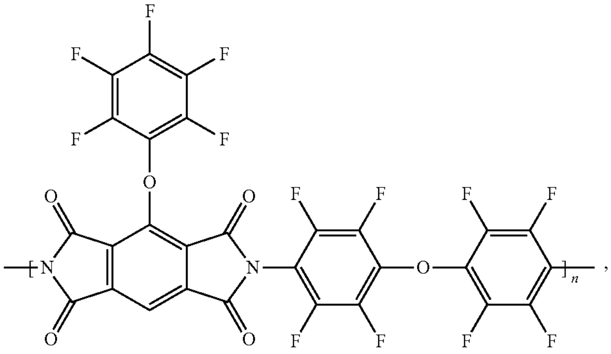,
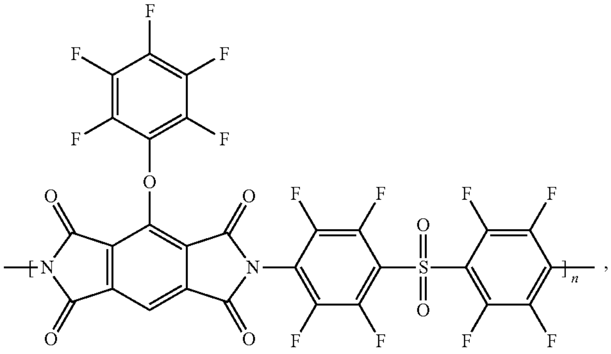,
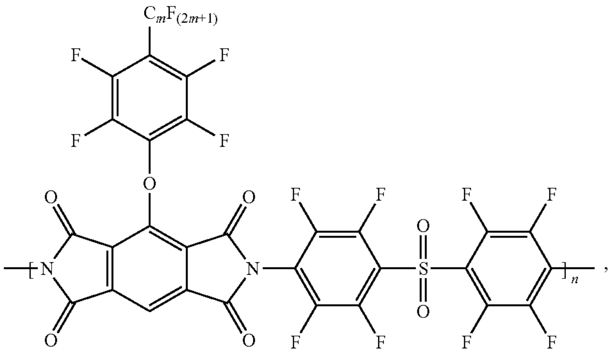,

-continued

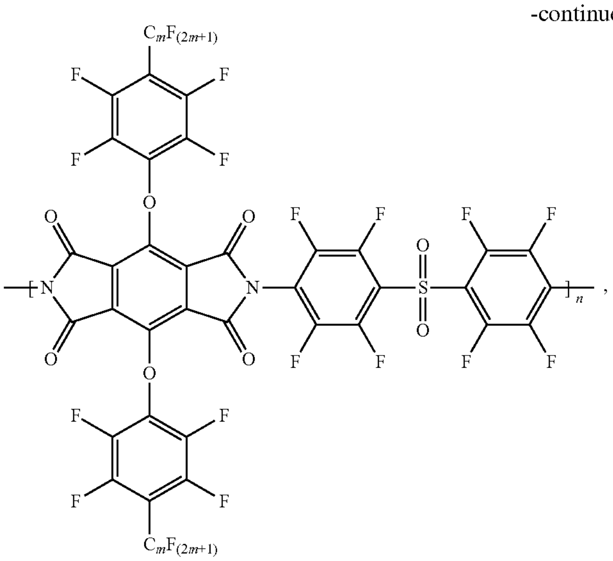

, and and mixtures thereof, wherein m is an integer of from 1 to about 18.

8. The fuser member of claim 1, wherein said outer layer has a thickness of from about 5 microns to about 100 microns.

9. The fuser member of claim 1, wherein said outer layer further comprises a filler.

10. The fuser member of claim 1, wherein Ar1 or Ar2 contains the active site.

11. The fuser member of claim 1, wherein the active site comprises from about 0.5 to about 50 weight percent of the fluorinated polyimide.

12. The fuser member of claim 1, further comprising an intermediate layer disposed between the substrate and the outer layer.

13. A fuser member comprising a substrate, and thereover, an outer layer comprising a crosslinked product resulted from a coating composition comprising a fluorinated polyimide and a curing agent, wherein said polyimide comprises:

(I)

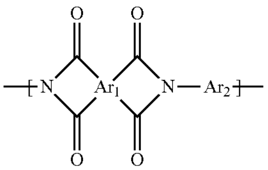

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group;

wherein the fluorinated polyimide includes an active site capable of reacting with the curing agent; and wherein said crosslinked product further comprises a fluoropolymer co-cured with the fluorinated polyimide.

14. The fuser member of claim 13, wherein said crosslinked product is selected from the group consisting of:

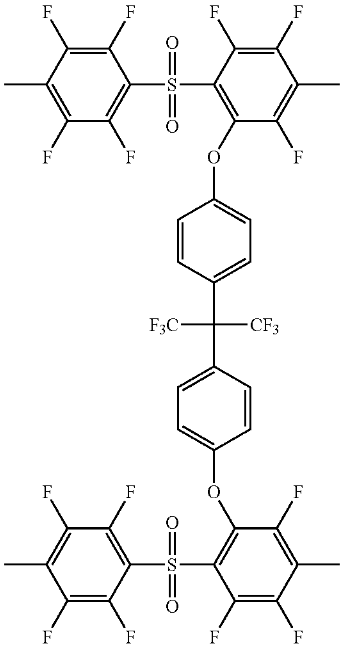

,

-continued
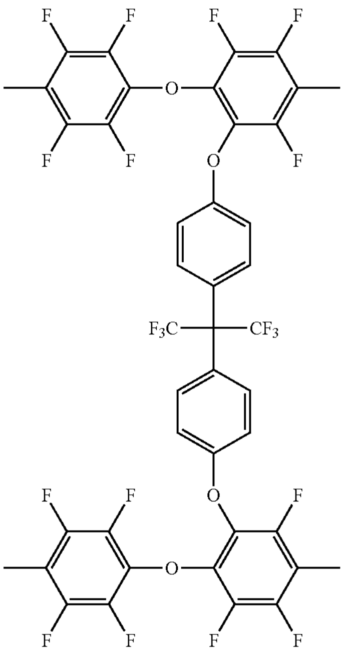
,
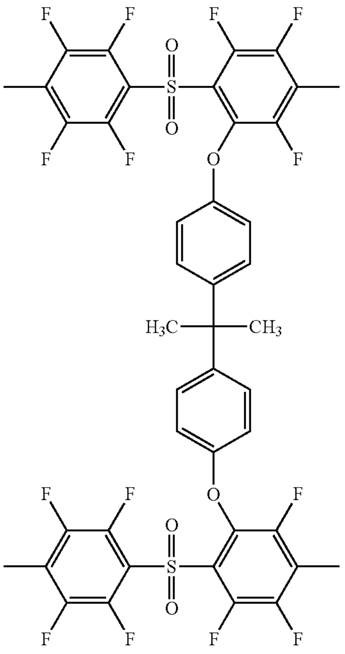
,
-continued
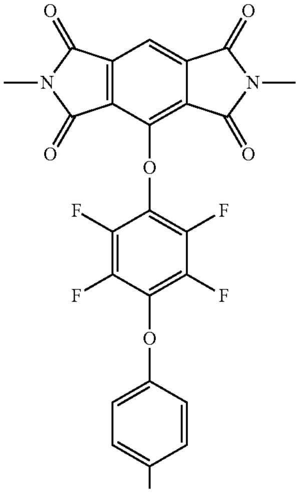
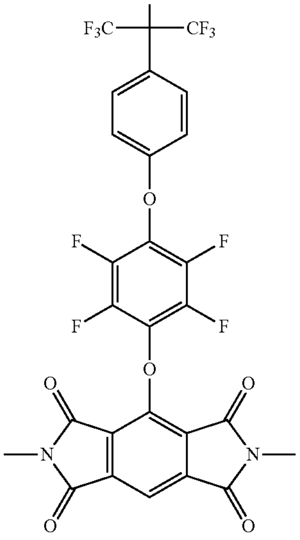
,
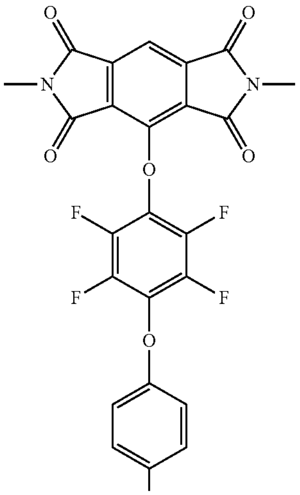

-continued

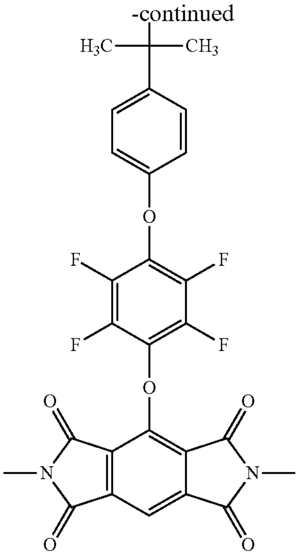

, and

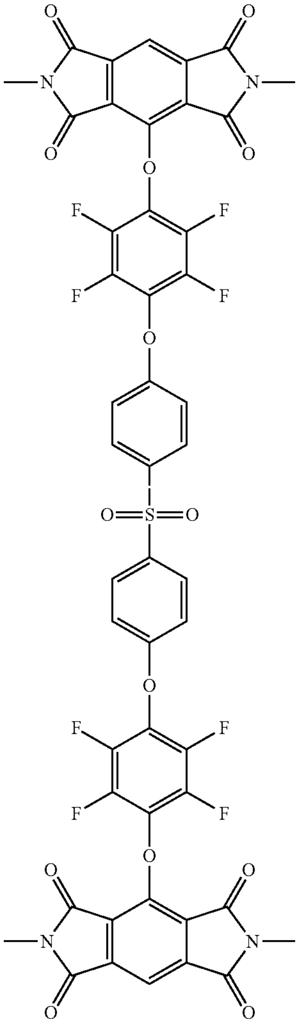

.

15. The fuser member of claim 13, wherein the cross linked product comprises a fluorinated polyimide group containing a fluoro-pendant group in the amount of from about 50 to about 95 weight percent of the total solids of the outer layer, and the crosslinking agent comprises from about 1 to about 10 weight percent of the total solids of the outer layer.

16. The fuser member of claim 13, wherein said fluoropolymer comprises a fluoropolymer selected from the group consisting of i) copolymers of vinylidenefluoride, hexafluoropropylene and tetrafluoropropylene and tetrafluoroethylene, ii) terpolymers of vinylidenefluoride, hexafluoropropylene and tetrafluoroethylene, and iii) tetrapolymers of vinylidenefluoride, hexafluoropropylene, tetrafluoroethylene, perfluoroalkoxy, fluorinated ethylene propylene and tetrafluoroethylene.

17. The fuser member of claim 13, wherein the crosslinked product results from a nucleophilic reaction at the active site of the segment with the curing agent.

18. An image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer component to transfer the developed image from the charge retentive surface to a copy substrate; and an oil-less fuser member for fusing toner images to a surface of the copy substrate, wherein said oil-less fuser member does not require the presence of a fuser oil for release, said oil-less fuser member comprising a substrate, and thereover, an outer layer comprising a fluorinated polyimide and a curing agent, wherein said fluorinated polyimide comprises:

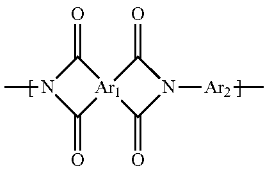

wherein $Ar_1$ and $Ar_2$ independently represent an aromatic group of from about 6 carbon atoms to about 60 carbon atoms; and at least one of $Ar_1$ and $Ar_2$ further contains a fluoro-pendant group; and wherein the fluorinated polyimide includes an active site capable of reacting with the curing agent.

* * * * *